May 2, 1950     A. BØNDING     2,506,407
GAFF FOR FISHING
Filed Feb. 18, 1948     2 Sheets-Sheet 1
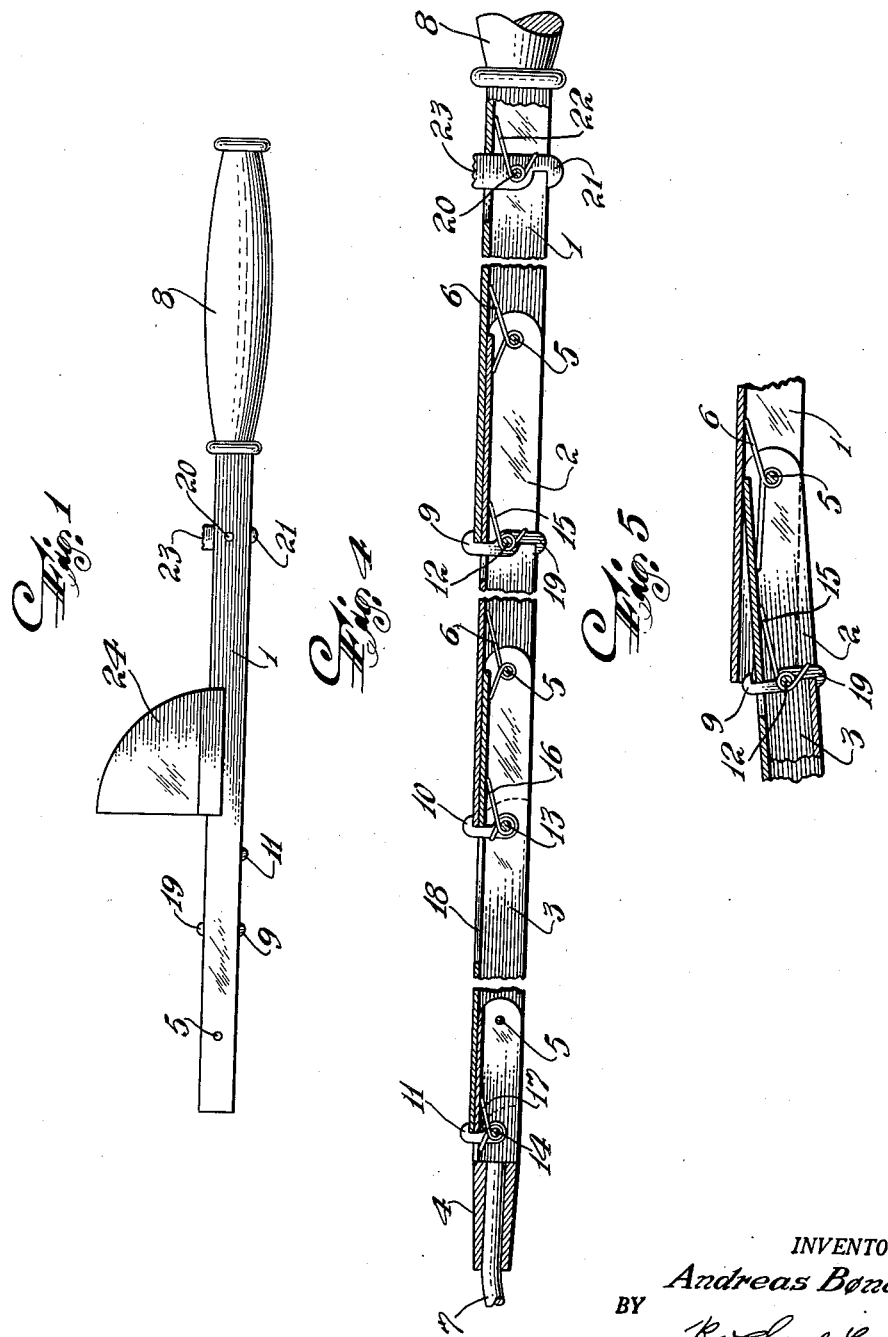
INVENTOR.
Andreas Bønding
BY
AGENT

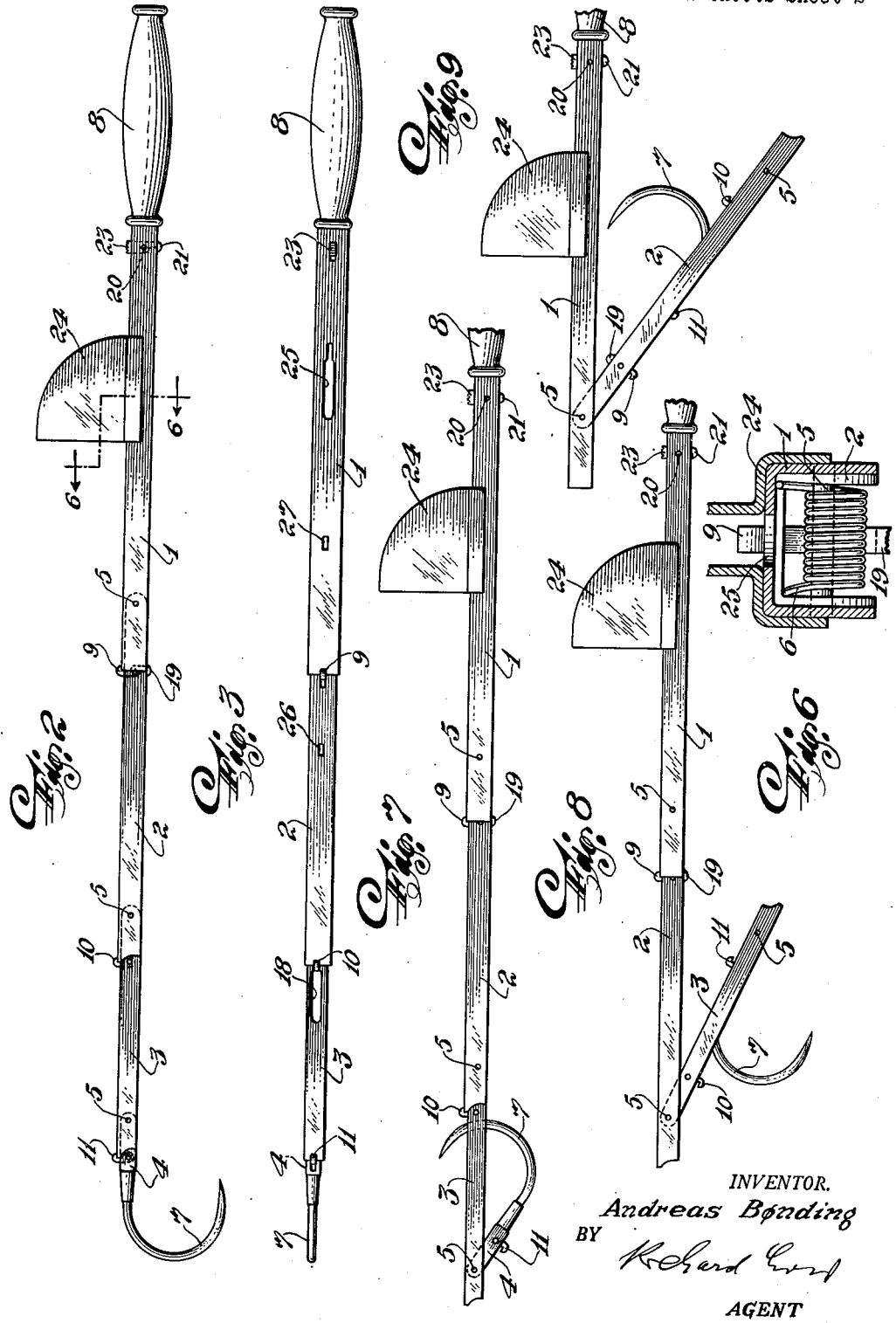

UNITED STATES PATENT OFFICE 2,506,407

GAFF FOR FISHING

Andreas Bønding, Horsens, Denmark

Application February 18, 1948, Serial No. 9,093
In Denmark January 24, 1947

Section 1, Public Law 690, August 8, 1946
Patent expires January 24, 1967

6 Claims. (Cl. 294—26)

The invention relates to a gaff for fishing consisting of a number of links or sections made of channel-shaped bars decreasing towards the end at which the hook is placed and provided with a handle at one end and a hook at the opposite end, which hook when the gaff is folded up enters into a protecting shield.

In the gaffs of known construction the protective shield is placed on the same side of the rod as the hook, so that the links of the rod cannot be folded so as to lie parallel to one another but will form an angle inside of which the hook will rest.

These disadvantages are overcome by the gaff according to the invention, the protective shield being provided on the top of the link next to the handle and being adapted to receive substantially the entire curved portion of the hook. The rod may further have its individual links interlocked in the operative position by means of a spring loaded detent, known per se, and be provided with a further set of detents so placed as to release a link for unfolding only when the opening movement of the preceding link has been completed.

As the hook should preferably be in a reasonably central position in relation to the centre line of the rod, in order that the considerable forces which are to be transmitted from the handle to the hook shall not have too great a torsional effect, the protective shield may have its aperture for the hook through a slit in the rod, and further, one or more of the folding links may as required be provided with slits which when the rod is folded up will correspond to the slit forming the entry to the protective covering.

Whereas it is a known practice to release a spring-loaded detent for the opening of a collapsible gaff, the result attained by adding the further set of detents mentioned will be that the individual links will not be released simultaneously. The unfolding of the gaff will in this way partake of the character of an unrolling, a feature that may be attained by a special embodiment of the detents by which the individual detents in the two sets are interconnected in pairs, so that when the gaff is unfolded one link will be locked to the preceding link and at the same time release the next link for opening when the former link concludes its turning movement. Further, the mentioned pairs of detents may according to the invention be rigidly connected and loaded by a common spring, which when the gaff is folded up will hold the other detent so that it will lock the preceding link. Thereby a further simplification of the gaff will be attained.

With the links of the gaff of my invention folded so as to rest inside one another, the gaff will take up considerably less space and afford less risk of fouling other fishing tackle with which it may be stowed.

The accompanying drawing shows an embodiment of a gaff according to the invention.

Fig. 1 is a side view of the gaff in folded condition;

Fig. 2 is a side view in extended condition;

Fig. 3 is a top view;

Fig. 4 is a longitudinal section of the unfolded or extended gaff, drawn to enlarged scale;

Fig. 5 is a fragmentary longitudinal section illustrating the unfolding movement;

Fig. 6 is a partially sectioned view, the section being taken in a plane of the line 6—6 of Fig. 2; and Figs. 7, 8 and 9 are side views illustrating consecutive folding positions.

The gaff consists of a rod divided into four links, 1, 2, 3, and 4, of decreasing lengths and cross sections, all having in cross section substantially the shape of an inverted U. The links are pivotally interconnected by means of pins, 5, carried through the side webs of the channel bars forming the rod. Each pin, 5, is provided with a coil spring, 6, which with its end presses against the bottoms of the links tending to turn the links into a position in prolongation of one another. The extreme link, 4, carries a hook, 7, and the link, 1, is at its free end provided with a handle, 8. The latter link is further provided with a protective shield, 24, for the hook, 7, the shield being placed on the top of the link, 1.

The springs, 6, are of sufficient dimension to swing the individual links into the position corresponding to the operative position of the gaff, but they are not sufficiently strong to keep the links in this position. This is being done by a set of detents, 9, 10, and 11, pivotally mounted on pins, 12, 13, and 14, around which springs, 15, 16, and 17 are placed which urge the detents to engage the ends of the links, 1, 2, and 3.

When the gaff is to be folded from the position shown in Fig. 2 into the folded position shown in Fig. 1, the procedure is as follows: First the detent, 11, is manually turned clear of the end of link 3 so that link 4 may be turned about the pin, 5, as shown in Figure 7, the hook 7, passing through a slot, 18, in link 3 (see Fig. 3), Thereby link 4 will disappear entirely into the interior of link 3. Then with a finger detent 10 is turned clear of the end of link 2, and link 3 may then be turned in relation to link 2 about their common pin 5, as best shown in Fig. 8. At the end of this turning movement a detent, 19, which is integrally formed with the detent, 9, but is facing in the opposite direction will grip the end of link 3 now released, see Figs. 5 and 8, so that links 2, 3, and 4 will now take up no more space than did link 2 originally. (At the same time that detent 19 engages the end of link 3, detent 9 is released from the end of link 1, so that without further manipulation it will be possible to turn link 2 in relation to link 1 about the common pin, 5, against the pressure of spring 6. Thereby the hook, 7, will be turned in through a slot 25 in the top of link 1 and will pass into the protective shield, 24. When link 2 has been turned fully into link 1, a detent, 21 turning on a pin, 20, will by means of a spring, 22, be made to engage the end of link 2 and lock this link. Thereby the folding of the gaff is completed.

It should be noted that during the successive folding operations the detent 11 enters the slot 26, and the detent 19 the slot 27, both slots being clearly shown in Fig. 3.

When the gaff is to be unfolded the same manipulations are made, but in the opposite order, and the movements are made automatically, one movement succeeding the other until the gaff is fully open. The opening movement is released by the pressure of a finger against a knurled part, 23, on the upper end of detent 21. Thereby the detent, 21, will disengage link 2, so that this link under the pressure of spring 6 will swing in relation to link 1 around their common pin, 5. When the link has swung out, detent 9 will engage the end of link 1, but due to its swinging movement the detent 19 will at the same time disengage link 3 which will then open. Fig. 5 shows the moment immediately preceding the moment at which detent 9 engages the end of link 1 and causes detent 19 to release link 3 for turning. Link 3 will then turn in relation to link 2 around their common pin, 5, under the pressure of spring 6, until link 3 has attained the position shown in Figs. 2, 3 or 4, in which detent 10 has gripped the end of link 2 and locked link 3 to link 2. Thereupon link 4 with the hook 7, will freely swing into the position shown in any of Figs. 2, 3 and 4, in which detent 11 will lock link 4 to link 3. There being no spring, 6, around the pin, 5, connecting links 3 and 4, the hook must be held at an angle during the opening movement in order that the hook, 7, may swing all the way into the position shown in Fig. 4, it will, however, be natural to hold the gaff in this inclined position when it is to be opened for operation.

Having reference to Fig. 6, this sectional view shows the links or sections 1 and 2 and illustrates their relation to each other and the relationship between the slot 25 and the shield 24.

The gaff may be produced in many ways besides that specified. Thus, it need not have four links, and the links may very well be of the same length.

Having now described my invention, what I claim as new and want to secure by Letters Patent is:

1. Folding gaff comprising a handle, a shank formed of pivotally connected sections, said sections having in cross section substantially the shape of an inverted U, a hook secured to the section most remote from the handle and with its point below the opening of said U, means to retain the gaff in an extended or a folded condition, and a shield provided on the top of the section next to the handle, each section being smaller in cross section than the next succeeding one in the direction toward the handle and being adapted, when folded into the open U of an adjacent section to fit wholly in said section, said shield thereby protectively receiving substantially the entire curved portion of the hook, said means comprising spring actuated detents provided on foldable sections and protruding beyond the tops of said foldable sections, each to engage an adjoining section and to retain two neighboring sections in extended condition, spring actuated detents provided on such sections as receive folded-in sections to hold the latter in the folded condition, and spring means to urge the foldable sections into the open position.

2. The gaff according to claim 1, wherein the top of said section next to the handle is provided with a slot through which substantially the entire curved portion of the hook enters said shield when the gaff is folded.

3. The gaff according to claim 1, wherein the tops of more than one section are provided with slots through which substantially the entire curved portion of the hook enters when the gaff is folded.

4. The gaff according to claim 1, wherein said means include at least one pair of oppositely directed and integrally formed detents, coil springs, and pins extending through the opposite sides of said sections, said pairs of detents and coil springs being mounted on said pins, each coil spring having its ends bearing against a section and its intermediate portion actuable with a pair of detents, one detent of each of said pairs protruding beyond the top of the respective section and being adapted to engage an adjoining section so as to retain two neighboring sections in extended condition, the other detent of each of said pairs being adapted to engage and to retain a folded-in section, the arrangement of said spring actuated pairs of detents being such that during the opening of the gaff, while one section is being latched to be kept extended, the next smaller section is simultaneously released.

5. The gaff according to claim 1, wherein said shank is formed of four sections and wherein said means include a pair of oppositely directed and integrally formed detents, a coil spring, and a pin extending through the opposite sides of a section, the pair of detents and the coil spring being mounted on said pin, the coil spring having its ends bearing against said section and its intermediate portion actuable with said pair of detents, one detent of said pair protruding beyond the top of said section and being adapted to engage an adjoining section so as to retain the two neighboring sections in extended condition, the other detent of said pair being adapted to engage and to retain the folded-in section, the arrangement of said spring actuated pair of detents being such that during the opening of the gaff, while one section is being latched to be kept extended, the next small section is simultaneously released.

6. The gaff according to claim 1, wherein said shank is formed of four sections and wherein said means include three detents, a pair of oppositely directed and integrally formed detents, coil springs, and pins extending through the opposite sides of said sections, said detents and said pair of detents, respectively, and said coil springs being mounted on said pins, each coil spring having its ends bearing against a section and its intermediate portion actuable with a detent and said pair of detents, respectively, two of said detents and one detent of said pair protruding beyond the top of the respective section and being adapted to engage an adjoining section so as to retain two neighboring sections in extended condition, one detent and the other detent of said pair being adapted to engage and to retain a folded-in section, the last named detent having a knurled part protruding beyond the top of the respective section, the arrangement of said spring actuated pair of detents being such that during the opening of the gaff, while one section is being latched to be kept extended, the next smaller section is simultaneously released.

ANDREAS BØNDING.

REFERENCES CITED

The following references are of record in the file of this patent:

UNITED STATES PATENTS

| Number | Name | Date |
|---|---|---|
| 2,112,765 | Darling | Mar. 29, 1938 |
| 2,214,660 | Darling | Sept. 10, 1940 |